United States Patent
Kitou et al.

(10) Patent No.: US 9,939,296 B2
(45) Date of Patent: Apr. 10, 2018

(54) SLIDE POSITION DETECTING DEVICE FOR VEHICLE SEAT

(71) Applicant: TOYOTA BOSHOKU KABUSHIKI KAISHA, Aichi-ken (JP)

(72) Inventors: Hidekazu Kitou, Aichi-ken (JP); Tatsuya Ono, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/251,501

(22) Filed: Aug. 30, 2016

(65) Prior Publication Data
US 2017/0067761 A1 Mar. 9, 2017

(30) Foreign Application Priority Data
Sep. 7, 2015 (JP) .................................. 2015-175498

(51) Int. Cl.
| | |
|---|---|
| F16M 11/38 | (2006.01) |
| G01D 11/30 | (2006.01) |
| B60N 2/06 | (2006.01) |
| B64D 11/06 | (2006.01) |
| B61D 33/00 | (2006.01) |
| B63B 29/06 | (2006.01) |
| G01D 5/12 | (2006.01) |
| B60N 2/02 | (2006.01) |

(52) U.S. Cl.
CPC ................ *G01D 11/30* (2013.01); *B60N 2/06* (2013.01); *B61D 33/0007* (2013.01); *B61D 33/0078* (2013.01); *B63B 29/06* (2013.01); *B64D 11/0639* (2014.12); *B64D 11/0696* (2013.01); *G01D 5/12* (2013.01); *B60N 2002/0272* (2013.01)

(58) Field of Classification Search
CPC ................ B60N 2/0725; B60N 2/0705; B60N 33/0078; B60N 2/06
See application file for complete search history.

(56) References Cited

U.S. PATENT DOCUMENTS 9,550,502 B2 * 1/2017 Kitou ....................... B60N 2/07
2012/0073369 A1   3/2012 Suzuki et al.

FOREIGN PATENT DOCUMENTS

JP       2012-71713       4/2012

* cited by examiner

*Primary Examiner* — Amy J. Sterling
(74) *Attorney, Agent, or Firm* — Greenblum & Bernstein, P.L.C.

(57) ABSTRACT

In a slide position detecting device for a vehicle seat, an angle between a bottom plate portion and a side plate portion of an attachment bracket is set to a maximum angle in a range of an angle between a bottom wall portion and a side wall portion of a seat-side member; rigidity maintaining the angle between the bottom plate portion and the side plate portion is set to be lower than rigidity maintaining the angle between the bottom wall portion and the side wall portion; and when the side plate portion is fixed to the side wall portion, the bottom plate portion contacts the bottom wall portion or a top face portion of an upper rail, and is fixed in a state where the angle between the bottom plate portion and the side plate portion coincides with the angle between the bottom wall portion and the side wall portion.

7 Claims, 8 Drawing Sheets

SLIDE POSITION DETECTING DEVICE FOR VEHICLE SEAT

INCORPORATION BY REFERENCE

The disclosure of Japanese Patent Application No. 2015-175498 filed on Sep. 7, 2015 including the specification, drawings and abstract is incorporated herein by reference in its entirety.

BACKGROUND OF THE INVENTION

1. Field of the Invention

The invention relates to a slide position detecting device for a vehicle seat provided in a vehicle such as an automobile, an aircraft, a vessel, or a train.

2. Description of Related Art

An example of a slide position detecting device for a vehicle seat is described in Japanese Patent Application Publication No. 2012-71713 (JP 2012-71713 A). The slide position detecting device includes: a magnetic detector attached to a movable rail; and a detected portion attached to a fixed rail at a position facing the magnetic detector. When the movable rail slides on the fixed rail, a slide position is detected by detecting whether or not the detected portion is placed at the position facing the magnetic detector. In the technique described in JP 2012-71713 A, a lower end of a side panel 3 and a base plate portion 4a of a bracket 4 having an L-shaped cross section are attached onto a top face of the movable rail 2 that is slidably fitted to the fixed rail 1, as illustrated in FIG. 10. A body portion of the side panel 3 and a side plate portion 4b of the bracket 4 are disposed on respective sides of the top face of the movable rail 2 in a width direction (a direction perpendicular to a longitudinal direction) such that the body portion of the side panel 3 and the side plate portion 4b face each other. A magnetic detector 5 is attached to a surface of the side plate portion 4b on a side opposite to the side panel 3. A detected body 6 is attached to the fixed rail 1 at a position facing the magnetic detector 5. The detected body 6 includes: an attachment portion 6a having an L-shaped cross section; and a detected portion 6b formed to extend horizontally from an upper end of the attachment portion 6a. The attachment portion 6a is a component made of an iron plate and attached to the fixed rail 1. When the movable rail 2 slides relative to the fixed rail 1 and the magnetic detector 5 comes to a position facing the detected portion 6b, the magnetic detector 5 can detect the detected portion 6b.

SUMMARY OF THE INVENTION

In the technique described in JP 2012-71713 A, the base plate portion 4a of the bracket 4 having an L-shaped cross section is attached to the top face of the movable rail 2, and a corner formed between the base plate portion 4a and the side plate portion 4b is disposed closer to the detected body 6. Accordingly, even if an angle between the base plate portion 4a and the side plate portion 4b varies due to a manufacturing variation, a distance between the magnetic detector 5 and the detected portion 6b does not change greatly. On the other hand, there is a case where the bracket 4 needs to be formed to have a U-shaped cross section and needs to be attached to the body portion of the side panel 3 due to restriction in a manufacturing process. That is, there is a case where a side plate portion 4c needs to be provided in a standing manner to extend from an end of the base plate portion 4a on a side opposite to the side plate portion 4b such that the side plate portion 4c is parallel to the side plate portion 4b, and the side plate portion 4c needs to be fixed to the body portion of the side panel 3. In this case, a corner 4d formed between the side plate portion 4c and the base plate portion 4a is disposed at a position distanced from the detected body 6. Accordingly, when an angle between the side plate portion 4c and the base plate portion 4a changes greatly due to the manufacturing variation, the distance between the magnetic detector 5 and the detected portion 6b changes greatly.

The invention provides a slide position detecting device for a vehicle seat, and the slide position detecting device makes it possible to prevent a distance between a magnetic detector and a detected body from changing greatly and deviating from an allowable range even in a case where a point at which a bracket is fixed to an upper rail is apart from the detected body, the bracket being configured to fix the magnetic detector to the upper rail.

An aspect of the invention relates to a slide position detecting device for a vehicle seat. The slide position detecting device includes a magnetic detector disposed in one of a lower rail and an upper rail, the lower rail being fixed to a body of a vehicle, the upper rail being fixed to the vehicle seat and fitted to the lower rail so as to be slidable in a front-rear direction; a detected portion disposed in the other of the lower rail and the upper rail; and an attachment bracket including a bottom plate portion and a side plate portion combined with the bottom plate portion. The upper rail includes a top face portion and a pair of side face portions combined with the top face portion, the upper rail having a basic sectional shape in a right-left direction that is a reverse U-shape opened downward; a bottom wall portion of a seat-side member that includes the bottom wall portion and a side wall portion combined with the bottom wall portion is attached to a top face of the top face portion in a state where the side wall portion is disposed on a side of one end of the top face portion in the right-left direction such that the side wall portion extends upward; the magnetic detector or the detected portion is disposed on a side of another end of the top face portion in the right-left direction and is attached to the side wall portion of the seat-side member via the attachment bracket; an angle between the bottom plate portion and the side plate portion of the attachment bracket is set to a maximum angle in a range of an angle between the bottom wall portion and the side wall portion of the seat-side member, the angle between the bottom wall portion and the side wall portion of the seat-side member varying due to a manufacturing variation; rigidity that maintains the angle between the bottom plate portion and the side plate portion of the attachment bracket is set to be lower than rigidity that maintains the angle between the bottom wall portion and the side wall portion of the seat-side member; and when the side plate portion of the attachment bracket is fastened and fixed to the side wall portion of the seat-side member, the bottom plate portion of the attachment bracket contacts the bottom wall portion of the seat-side member or the top face portion of the upper rail, and is fixed in a state where the angle between the bottom plate portion and the side plate portion of the attachment bracket coincides with the angle between the bottom wall portion and the side wall portion of the seat-side member.

With the above configuration, the side wall portion of the seat-side member is disposed on the side of one end of the top face portion of the upper rail in the right-left direction, and the magnetic detector or the detected portion is disposed on the side of the other end of the top face portion of the upper rail in the right-left direction and is attached to the side wall portion via the attachment bracket. In this case, the attachment bracket is configured such that the angle between the bottom plate portion and the side plate portion is set to the maximal angle in the range of the angle between the bottom wall portion and the side wall portion of the seat-side member, the angle between the bottom wall portion and the side wall portion varying due to a manufacturing variation. Further, the rigidity that maintains the angle between the bottom plate portion and the side plate portion of the attachment bracket is set to be lower than the rigidity that maintains the angle between the bottom wall portion and the side wall portion of the seat-side member. Accordingly, when the side plate portion of the attachment bracket is fastened and fixed to the side wall portion of the seat-side member, the angle between the bottom plate portion and the side plate portion is made coincident with the angle between the bottom wall portion and the side wall portion of the seat-side member in a state where a bottom face of the bottom plate portion of the attachment bracket contacts a top face of the bottom wall portion of the seat-side member or the top face portion of the upper rail. That is, even if the angle between the bottom wall portion and the side wall portion of the seat-side member varies due to the manufacturing variation, an angle of the bottom plate portion of the attachment bracket with respect to the top face portion of the upper rail does not change. This makes it possible to suppress a change in a position, in an up-down direction, of the magnetic detector or the detected portion attached to a portion of the bottom plate portion of the attachment bracket, the portion being on a side opposite to the side plate portion. Thus, it is possible to dispose the magnetic detector or the detected portion at a stable position by absorbing a variation in the angle between the bottom wall portion and the side wall portion of the seat-side member.

In the above aspect, a weakened portion that weakens the rigidity that maintains the angle between the bottom plate portion and the side plate portion of the attachment bracket may be provided in the bottom plate portion or the side plate portion at a position in vicinity of a connected part between the bottom plate portion and the side plate portion.

With the above configuration, when the side plate portion of the attachment bracket is fastened and fixed to the side wall portion of the seat-side member, the angle of the side plate portion with respect to the bottom plate portion is easily changed with the weakened portion serving as a starting point, while the bottom plate portion of the attachment bracket is maintained in contact with the bottom wall portion of the seat-side member or the top face portion of the upper rail.

In the above aspect, an end portion of the bottom plate portion of the attachment bracket on a side opposite to the side plate portion may be provided with an attachment seat portion extending upward and facing the side plate portion; and the magnetic detector or the detected portion may be attached to the attachment seat portion.

With the above configuration, the magnetic detector or the detected portion can be fixed at a desired position in the up-down direction by causing the magnetic detector or the detected portion to contact the attachment seat portion. This makes it possible to increase a degree of flexibility in setting a position in a height direction at which the magnetic detector or the detected portion is attached to the upper rail.

In the above aspect, a projecting rib continuously extending from the bottom plate portion to the attachment seat portion of the attachment bracket may be provided on an inner side of the attachment bracket.

With the above configuration, it is possible to increase rigidity that maintains an angle between the bottom plate portion of the attachment bracket and the attachment seat portion to which the magnetic detector or the detected portion is attached, thereby making it possible to more stably suppress a variation in a distance, in the up-down direction, between the magnetic detector and the detected portion.

In the above aspect, a part of the side plate portion may be fastened to the side wall portion of the seat-side member with a bolt, and the part may be disposed between a front end and a rear end of the bottom plate portion of the attachment bracket.

With the above configuration, when the side plate portion of the attachment bracket is fastened to the side wall portion of the seat-side member with a bolt, both a front side and a rear side of the bottom plate portion of the attachment bracket relative to a bolt fastening part contact the top face of the bottom wall portion of the seat-side member or the top face portion of the upper rail. This makes it difficult for the attachment bracket to rotate relative to the seat-side member or the upper rail, so that an attachment operation is easily performed.

In the above aspect, the seat-side member may be formed to have an L-shaped section in the right-left direction by combining the bottom wall portion and the side wall portion; and the attachment bracket may be formed to have a substantially L-shaped basic section in the right-left direction by combining the bottom plate portion and the side plate portion.

With the above configuration, it is possible to dispose the magnetic detector or the detected portion at a stable position in the up-down direction by absorbing a variation in the angle between the bottom wall portion and the side wall portion of the seat-side member having an L-shaped section in the right-left direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIGS. 1 to 9 illustrate one embodiment of the invention. This embodiment is an example in which the invention is applied to a vehicle seat (in other words, a seat for an automobile). In each of the figures, each direction with respect to a vehicle at a time when the vehicle seat is attached to the vehicle is indicated by an arrow. In the following description, a description related to a direction shall be made on the basis of this direction. A slide rail of the vehicle seat is configured to adjust a position of the vehicle seat in a front-rear direction with respect to a floor, and a pair of slide rails is disposed in lower sides of right and left side portions of the vehicle seat. The following description deals with one of the slide rails, and with regard to the other one of the slide rails, only different points are described without a detailed description thereof.

Figure 1:
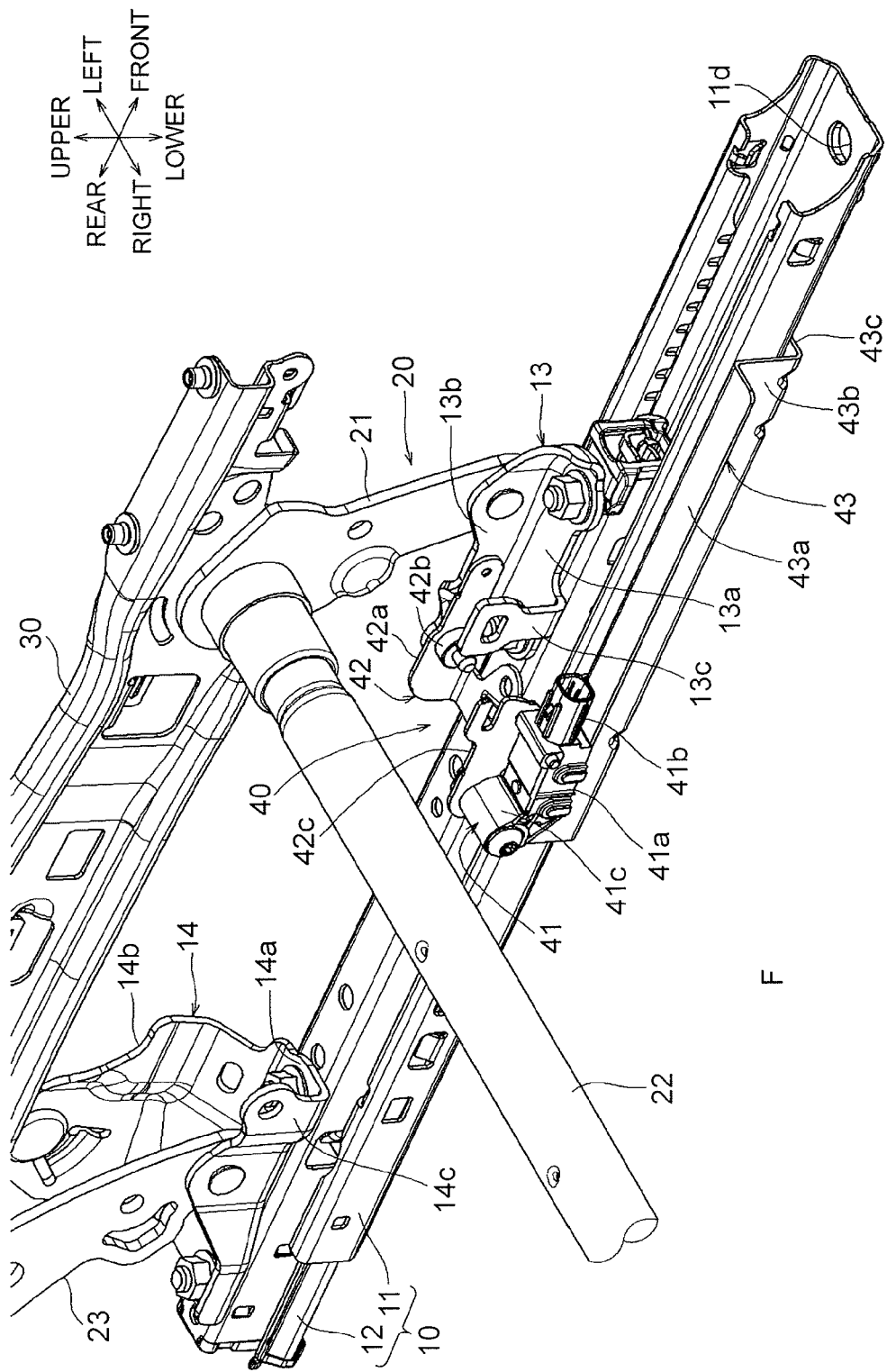
FIG. 1 is a perspective view illustrating a state where a slide position detecting device according to an embodiment of the invention is applied to a vehicle seat.
Figure 2:
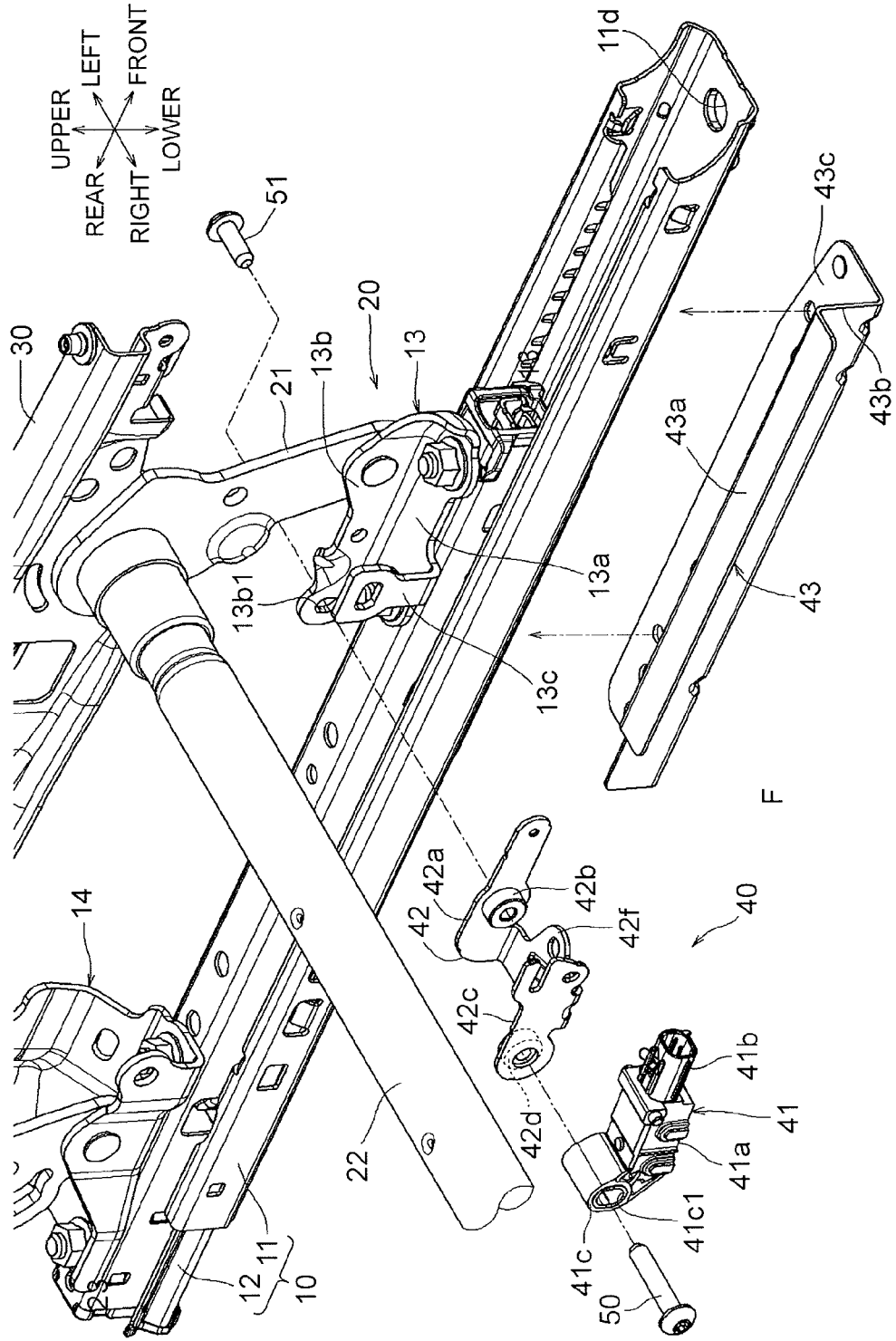
FIG. 2 is an exploded perspective view of the slide position detecting device in FIG. 1.
Figure 3:
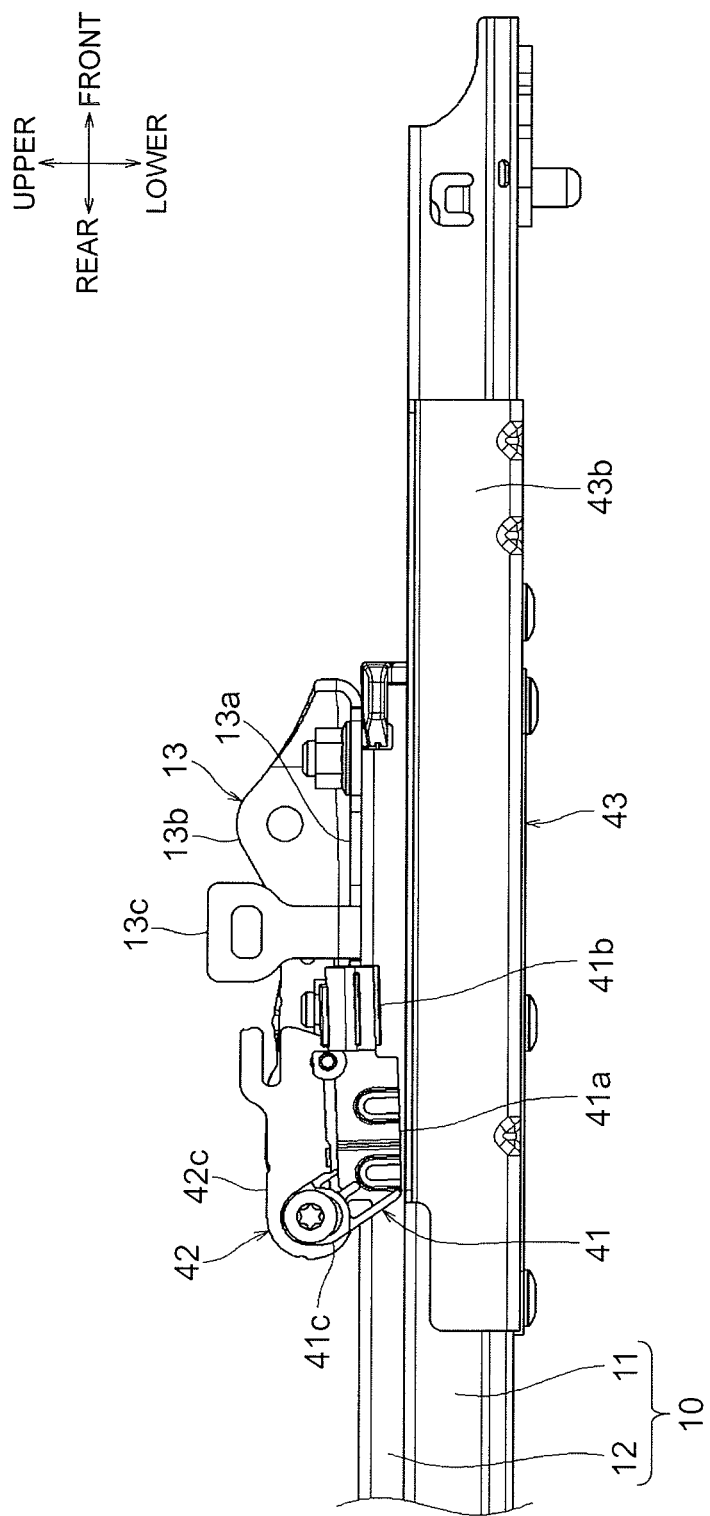
FIG. 3 is a side view illustrating a state where the slide position detecting device is attached to a slide rail in the above embodiment.
Figure 5:
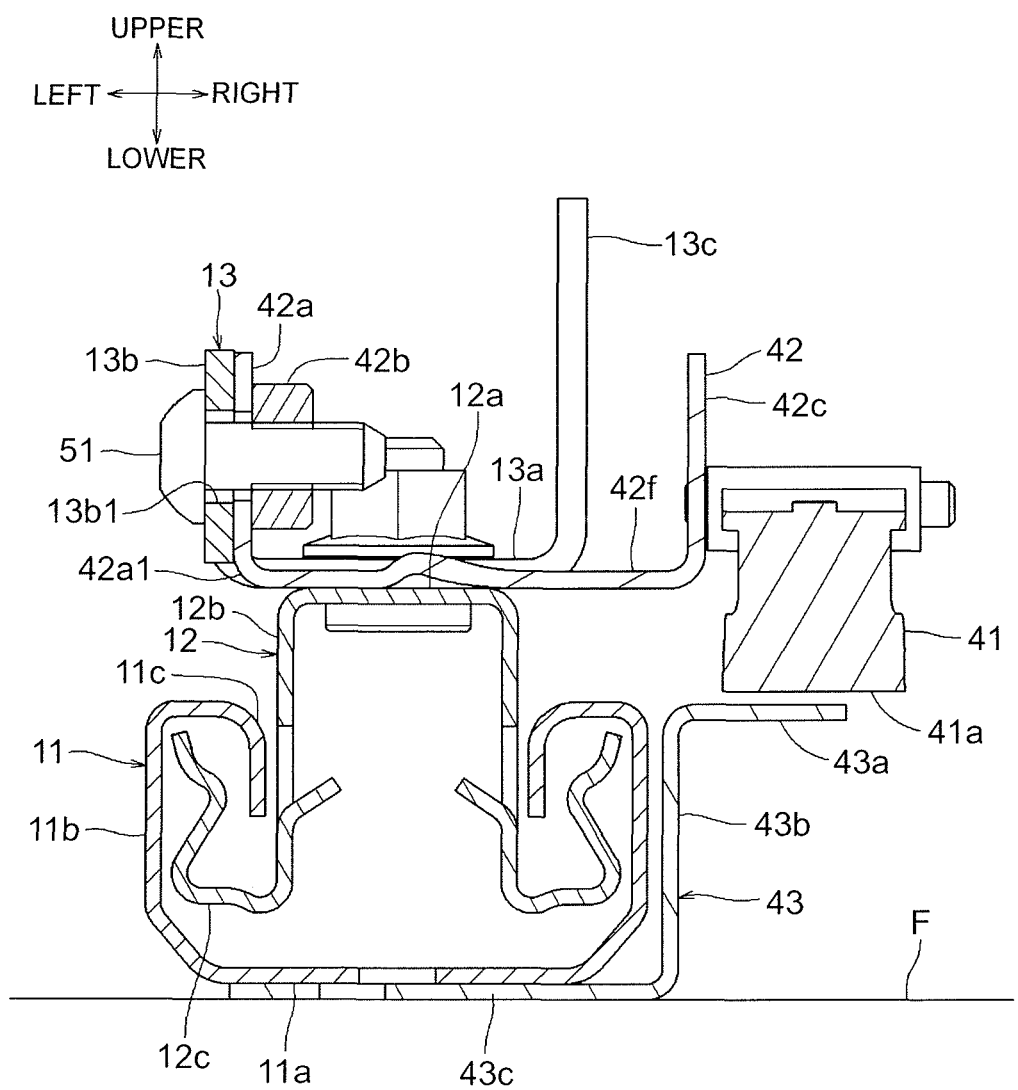
FIG. 5 is a sectional view taken along a line V-V in FIG. 4.
Figure 6:
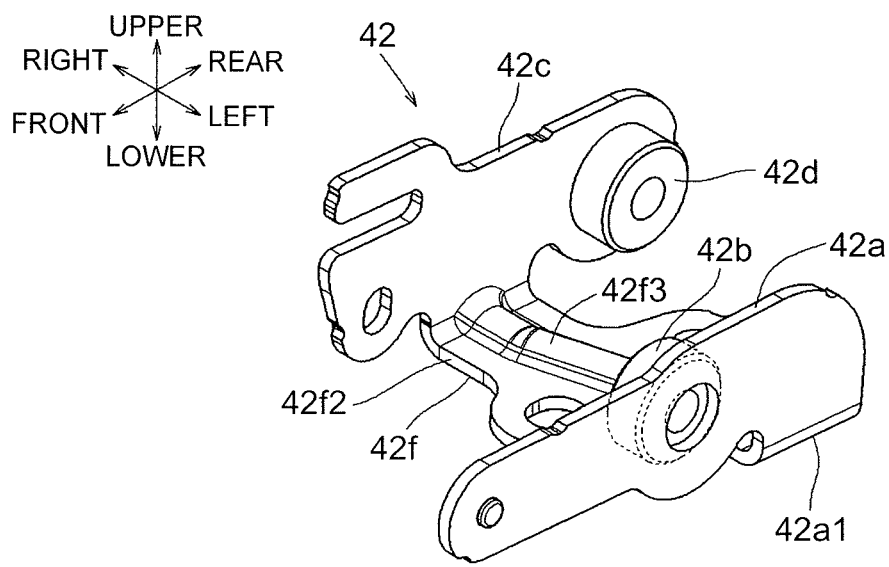
FIG. 6 is a perspective view of an attachment bracket according to the above embodiment.

As illustrated in FIGS. 1 and 2, a slide rail 10 includes: a lower rail 11 disposed in a lower side of a left side portion of a vehicle seat so as to extend in the front-rear direction and fixed to a floor F; and an upper rail 12 extending in the front-rear direction and fitted to the lower rail 11 such that the upper rail 12 is slidable in the front-rear direction. As illustrated in FIG. 5, the lower rail 11 is a member having a uniform section, and includes a bottom face portion 11a, side face portions (standing wall portions) 11b, and downward bent portions 11c. Bolts are inserted through a bolt hole 11d provided in a front end of the bottom face portion 11a and a bolt hole (not shown) similarly provided in a rear end of the bottom face portion 11a such that the lower rail 11 is fixed to the floor F in a fastened manner. As illustrated in FIG. 5, the upper rail 12 is a member having a uniform section, and includes a top face portion 12a, side face portions 12b, and upward bent portions 12c. The basic sectional shape of the upper rail 12 is a reverse U-shape opened downward and formed by the top face portion 12a and the side face portions 12b. The side face portions 12b and the upward bent portions 12c are fitted to the side face portions 11b and the downward bent portions 11c of the lower rail 11. Further, rolling members (not shown) such as balls or rollers are inserted between the upper rail 12 and the lower rail 11, so as to decrease a sliding friction.

A front bracket 13 is attached to a front end of the top face portion 12a of the upper rail 12, and a rear bracket 14 is attached to a rear end of the top face portion 12a. As illustrated in FIG. 2, the front bracket 13 is a plate-shaped member including a bottom wall portion 13a extending in the front-rear direction, a side wall portion 13b provided in an upward standing manner to extend from a front end of the bottom wall portion 13a toward a left side end of the bottom wall portion 13a, and a harness attachment portion 13c provided in a standing manner in a right side end of the bottom wall portion 13a. Here, the front bracket 13 may be regarded as a "seat-side member" of the invention.

Figure 4:
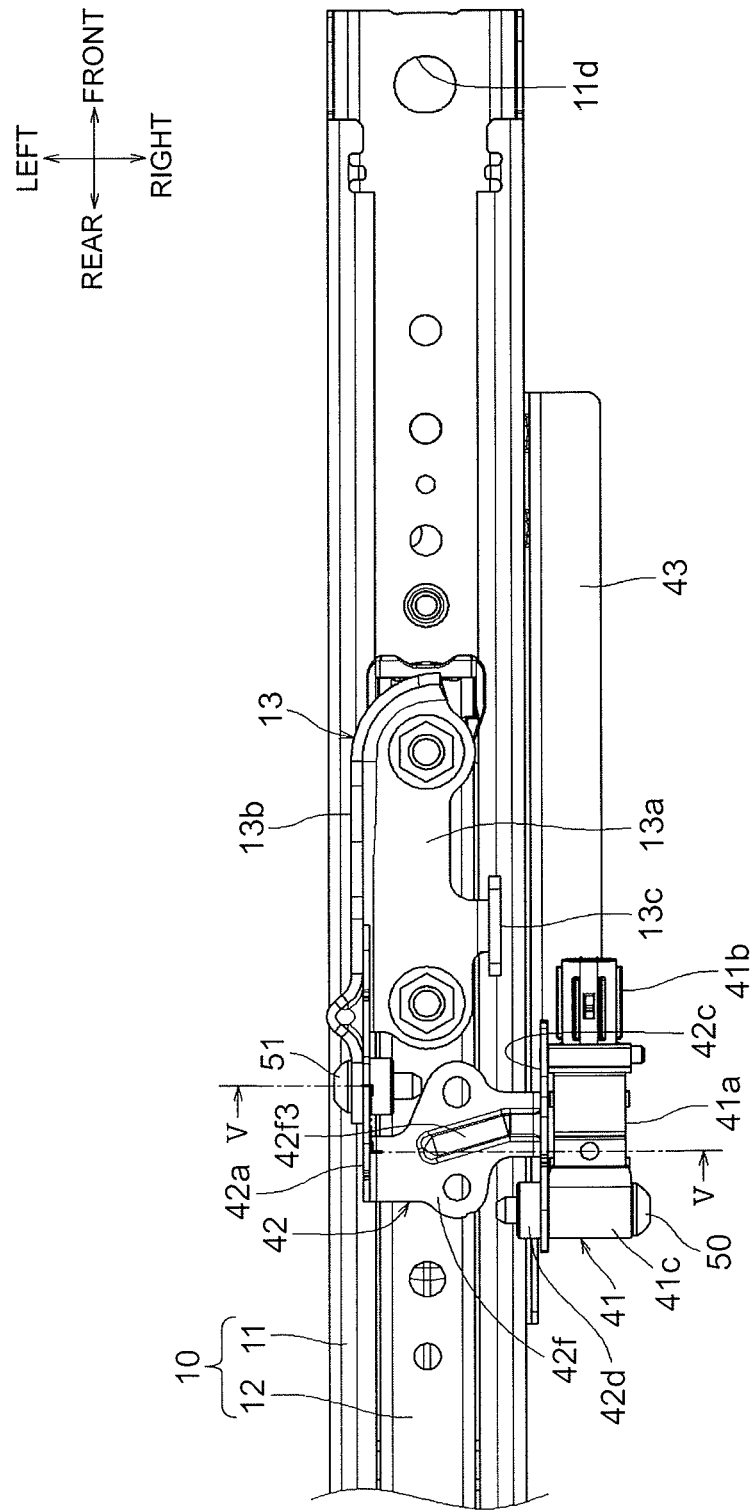
FIG. 4 is a plan view illustrating a state where the slide position detecting device is attached to the slide rail in the above embodiment.

As illustrated in FIG. 4, the bottom wall portion 13a has a substantially rectangular shape in a top view. A long-side direction of the bottom wall portion 13a extends in the front-rear direction, and a short-side direction thereof extends in a right-left direction such that the bottom wall portion 13a has substantially the same length in the right-left direction as the length of the top face portion 12a of the upper rail 12 in the right-left direction. A front left corner of the bottom wall portion 13a has an R-shape, a radius of which is substantially equal to the length of the top face portion 12a of the upper rail 12 in the right-left direction. Further, a front part and a rear part of the bottom wall portion 13a each have one bolt hole for fastening the front bracket 13 to the top face portion 12a of the upper rail 12 with a bolt.

As illustrated in FIGS. 1 to 4, the side wall portion 13b is formed so as to extend upward substantially perpendicularly to a part of the left side portion of the bottom wall portion 13a other than a part formed in the R-shape. An angle formed by the side wall portion 13b with respect to the bottom wall portion 13a may vary to 93 degrees at the maximum due to a variation in accuracy of press working. A lower end of a front link 21 is pivotally supported so as to be rotatable in an up-down direction in a front side of the left side portion of the side wall portion 13b other than the part formed in the R-shape. The front link 21 is a plate-shaped member forming a lifter mechanism 20. A bolt hole 13b1 for attaching an attachment bracket 42 is provided in the vicinity of a rear end of the left side portion of the side wall portion 13b.

As illustrated in FIG. 1, an upper end of the front link 21 is connected to an upper end of a front link attached to the other slide rail (provided on a right side relative to the slide rail 10) by a front pipe 22, and thus, the two front links are configured to pivot together with respect to the front bracket 13. The rear bracket 14 is a plate-shaped member including: a bottom wall portion 14a extending in the front-rear direction; a curved side wall portion 14b extending upward in a curved manner from a left side end of the bottom wall portion 14a; and a side wall portion 14c provided in a standing manner in a right side end of the bottom wall portion 14a. A lower end of a rear link 23 is pivotally supported so as to be rotatable in the up-down direction in the vicinity of a central part of the side wall portion 14c in the front-rear direction. The rear link 23 is a plate-shaped member forming the lifter mechanism 20. An upper end of the rear link 23 is connected to an upper end of a rear link attached to the other slide rail (provided on the right side relative to the slide rail 10) by a rear pipe (not shown), and thus, the two rear links are configured to pivot together with respect to the rear bracket 14.

The front pipe 22 is rotatably attached to the vicinity of a front end of a side frame 30 forming a cushion frame. The rear pipe is rotatably attached to the vicinity of a rear end of the side frame 30. The side frame 30 is a plate-shaped member and has substantially a shape in which flanges extending toward a seat outer side are provided in upper and lower ends of a plate material extending in the front-rear direction. The side frame 30 and the other side frame are connected to each other by the front pipe 22 and the rear pipe, and their front ends are connected by a front panel (not shown), so as to form the cushion frame. When the front link 21 or the rear link 23 is caused to pivot relative to the cushion frame by a link operation mechanism (not shown), the lifter mechanism 20 that can move the cushion frame in the up-down direction relative to the slide rail is formed.

As illustrated in FIG. 2, a slide position detecting device 40 mainly includes a magnetic detector 41, an attachment bracket 42, and a detected body 43, and the slide position detecting device 40 is attached only to the slide rail 10. That is, the slide position detecting device 40 is not provided in the other slide rail, and one slide position detecting device 40 is provided for one vehicle seat. The magnetic detector 41 is made of resin integrally, and includes a magnetic-force detecting portion 41a, a connector attachment portion 41b to which a wiring connector is attached, and a detector attachment portion 41c for attaching the magnetic detector 41 to the attachment bracket 42. A bolt hole 41c1 is provided in the detector attachment portion 41c.

As illustrated in FIGS. 6 to 9, the attachment bracket 42 is a member having substantially a shape in which lower ends of two plate materials distanced from each other to face each other are connected to each other integrally in a substantially U-shape in a front view. The attachment bracket 42 is formed by press molding so as to have a thickness that is approximately half of a thickness of the front bracket 13. The attachment bracket 42 includes a front-bracket attachment portion 42a, a magnetic-detector attachment portion 42c, and a connection portion 42f that connects the front-bracket attachment portion 42a to the magnetic-detector attachment portion 42c. Here, the front-bracket attachment portion 42a and the connection portion 42f may be regarded as a "side plate portion" and a "bottom plate portion" of the invention, respectively.

Figure 7:
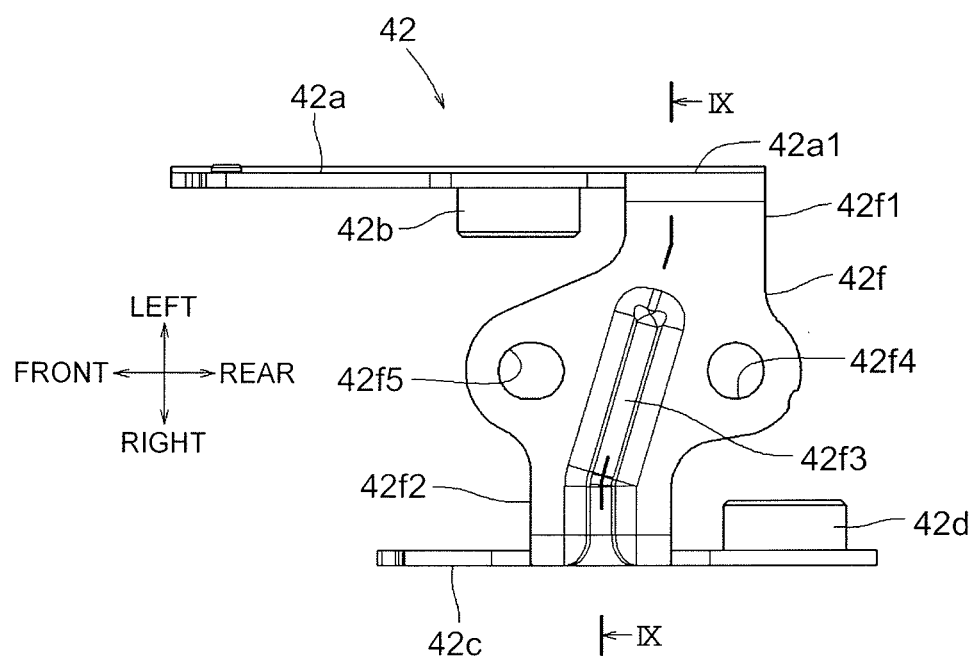
FIG. 7 is a plan view of the attachment bracket in the above embodiment, when viewed from a lower side.
Figure 8:
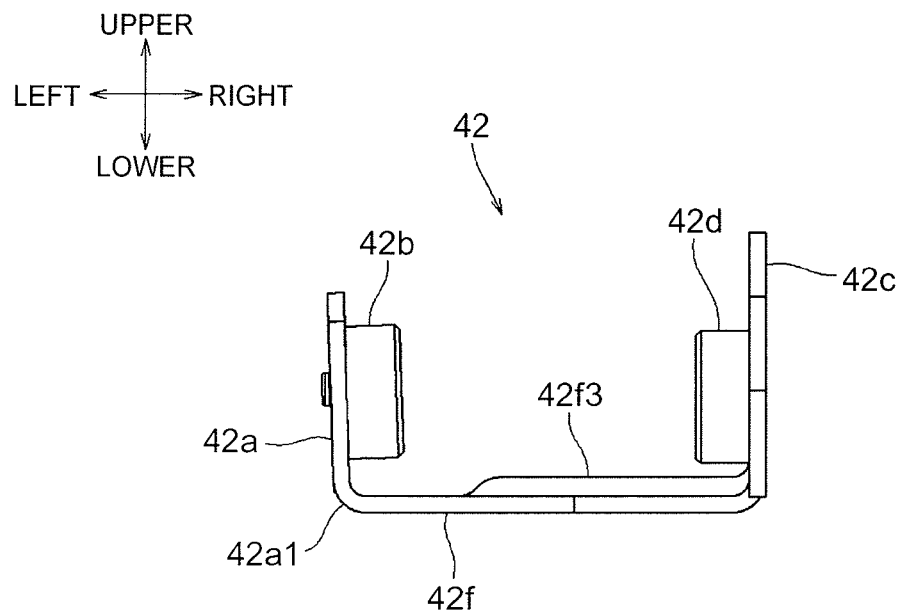
FIG. 8 is a front view of the attachment bracket in the above embodiment.
Figure 9:
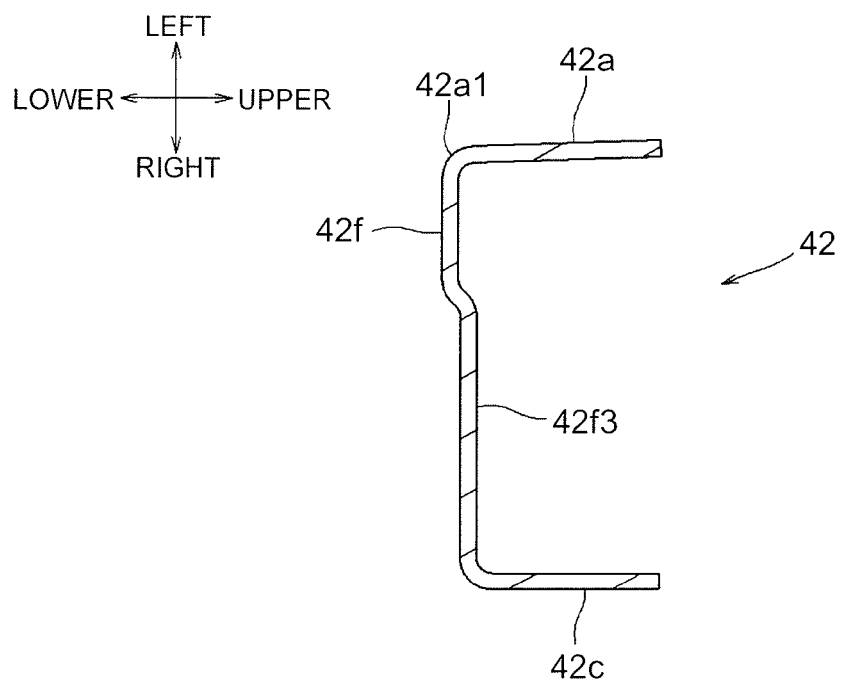
FIG. 9 is a sectional view taken along a line IX-IX in FIG. 7.
Figure 10:
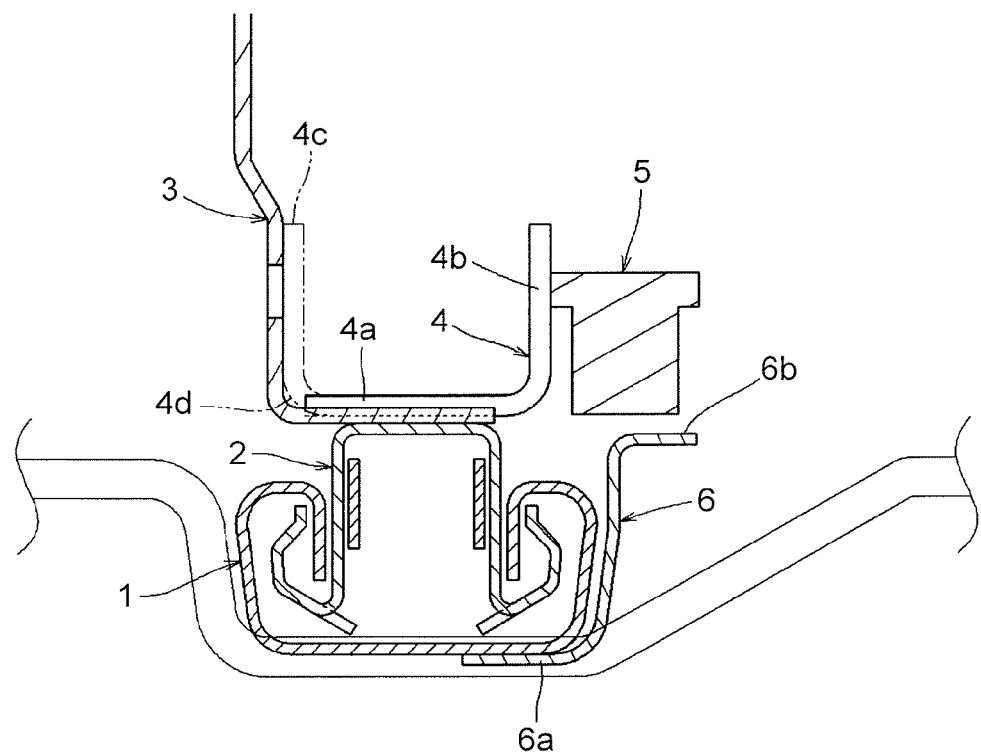
FIG. 10 is a sectional view illustrating a state where a slide position detecting device in related art is applied to a vehicle seat.

The connection portion 42f is formed in a plate shape disposed in a horizontal manner and having a constricted shape extending in the right-left direction and configured such that front-rear lengths of both ends thereof in the right-left direction are shorter than that of a central part thereof in the right-left direction. As illustrated in FIG. 7, a left constricted part 42f1 and a right constricted part 42f2 have substantially the same front-rear length, which is substantially half of the front-rear length of the central part. Further, the left constricted part 42f1 is disposed on a rear side relative to the right constricted part 42f2. The central part of the connection portion 42f in the right-left direction has a hole 42f4 formed on a rear side and a hole 42f5 formed on a front side. The hole 42f4 and the hole 42f5 are used for positioning when the attachment bracket 42 is machined. Here, the left constricted part 42f1 may be regarded as a "weakened portion" of the invention.

The front-bracket attachment portion 42a is a plate-shaped part having a substantially rectangular shape in a side view. The front-bracket attachment portion 42a is disposed to extend substantially perpendicularly to the connection portion 42f such that a long-side direction of the front-bracket attachment portion 42a substantially coincides with the front-rear direction and a short-side direction of the front-bracket attachment portion 42a substantially coincides with the up-down direction, and the front-bracket attachment portion 42a is connected to the connection portion 42f. That is, the basic sectional shape of the attachment bracket 42 is formed in a substantially L-shape by the front-bracket attachment portion 42a and the connection portion 42f. More specifically, a lower side of a rear end of the front-bracket attachment portion 42a is connected to the left constricted part 42f1 of the connection portion 42f. In this case, a connected part between the connection portion 42f and the front-bracket attachment portion 42a is a corner 42a1, and an angle between the connection portion 42f and the front-bracket attachment portion 42a is set to 93 degrees. That is, the angle between the connection portion 42f and the front-bracket attachment portion 42a is set to the maximum angle in a range of the angle between the bottom wall portion 13a and the side wall portion 13b of the front bracket 13, the angle between the bottom wall portion 13a and the side wall portion 13b varying due to a variation in accuracy of press working. In a substantially central part of the front-bracket attachment portion 42a in the front-rear direction, a hole for fixing the attachment bracket 42 to the side wall portion 13b of the front bracket 13 by bolt fastening is provided. A nut 42b is fixed on a surface on the connection-portion 42f-side so as to be coaxial with the hole. As illustrated in FIGS. 4 and 5, a fixed position of the nut 42b is determined to be a position where an axis of the nut 42b coincides with an axis of the bolt hole 13b1 provided in the side wall portion 13b of the front bracket 13 when a bottom face of the connection portion 42f of the attachment bracket 42 contacts the top face portion 12a of the upper rail 12. Further, the axis of the nut 42b is positioned between a forefront part and a rearmost part of the central part of the connection portion 42f in the right-left direction. Thus, when the attachment bracket 42 is fastened to the front bracket 13 with a bolt, the connection portion 42f of the attachment bracket 42 is maintained in contact with the top face portion 12a of the upper rail 12, thereby preventing the attachment bracket 42 from rotating. This improves work efficiency when the attachment bracket 42 is fastened to the front bracket 13 with a bolt.

The magnetic-detector attachment portion 42c is a plate-shaped part having a substantially rectangular shape in a side view. The magnetic-detector attachment portion 42c is disposed to extend substantially perpendicularly to the connection portion 42f such that a long-side direction of the magnetic-detector attachment portion 42c substantially coincides with the front-rear direction and a short-side direction of the magnetic-detector attachment portion 42c substantially coincides with the up-down direction, and the magnetic-detector attachment portion 42c is connected to the connection portion 42f. More specifically, a lower side of a central part of the magnetic-detector attachment portion 42c in the front-rear direction is connected to the right constricted part 42f2 of the connection portion 42f. In this case, an angle between the connection portion 42f and the magnetic-detector attachment portion 42c is set to 90 degrees. In a rear end side of the magnetic-detector attachment portion 42c, a hole for fixing the detector attachment portion 41c of the slide position detecting device 40 by bolt fastening is provided, and a nut 42d is fixed on a surface on the connection portion 42f-side so as to be coaxial with the hole. A rib 42f3 is provided to extend from the connection portion 42f to a lower end of the magnetic-detector attachment portion 42c. More specifically, the rib 42f3 is formed in a groove shape projecting upward so as to extend from a substantially central part of the connection portion 42f in the right-left direction to a connected part of the magnetic-detector attachment portion 42c. This accordingly makes it difficult for the angle between the connection portion 42f and the magnetic-detector attachment portion 42c to change from 90 degrees.

As illustrated in FIG. 2, the detected body 43 is a member made of iron and having a substantially L-shaped section. The detected body 43 includes: a detection face portion 43a having a long rectangular shape extending in the front-rear direction; a standing wall portion 43b provided so as to extend downward from one end of the detection face portion 43a in the right-left direction; and a lower-rail attachment portion 43c provided so as to extend from a lower end of the standing wall portion 43b in a direction opposite to the detection face portion 43a in parallel with the detection face portion 43a. The detection face portion 43a faces the magnetic detector 41 and serves as a portion detected by the magnetic detector 41. As illustrated in FIG. 5, the standing wall portion 43b is set such that the detection face portion 43a is disposed at the same height as an upper end of the standing wall portion 11b of the lower rail 11 when the detected body 43 is attached to the lower rail 11. The detected body 43 is attached to the vicinity of the front end of the lower rail 11. The attachment is performed as follows. A top face of the lower-rail attachment portion 43c is brought into contact with a bottom face of the bottom face portion 11a of the lower rail 11, and in a state where the standing wall portion 43b is disposed close to an outer surface of the standing wall portion 11b of the lower rail 11, the lower-rail attachment portion 43c is fastened to the bottom face portion 11a of the lower rail 11 with a screw. Instead of screw fastening, the lower-rail attachment portion 43c may be fixed by welding.

The following describes a procedure of attaching the attachment bracket 42 and the magnetic detector 41 to the front bracket 13 attached to the upper rail 12, and operation and effects of the present embodiment. As illustrated in FIG. 2, a bolt 50 is inserted through the bolt hole 41c1 provided in the detector attachment portion 41c of the magnetic detector 41 from a side opposite to the nut 42d provided in the magnetic-detector attachment portion 42c of the attachment bracket 42, and the bolt 50 is fastened to the nut 42d. Thus, the magnetic detector 41 is attached to the attachment bracket 42. Subsequently, a bottom face of the connection portion 42f of the attachment bracket 42 is caused to contact a top face of the top face portion 12a of the upper rail 12 at a position behind the bottom wall portion 13a of the front bracket 13 attached to the upper rail 12, such that the bolt hole 13b1 provided in the side wall portion 13b of the front bracket 13 corresponds to the nut 42b provided in the front-bracket attachment portion 42a of the attachment bracket 42. In this state, a bolt 51 inserted through the bolt hole 13b1 is fastened to the nut 42b. In this case, the angle between the connection portion 42f and the front-bracket attachment portion 42a of the attachment bracket 42 is set to 93 degrees, that is, the maximum angle in a range of the angle between the bottom wall portion 13a and the side wall portion 13b of the front bracket 13, the angle between the bottom wall portion 13a and the side wall portion 13b varying due to a variation in accuracy of press working. Further, the attachment bracket 42 is thinner than the front bracket 13 and the connected part of the connection portion 42f is provided with the constricted part 42f1, the connected part being connected to the front-bracket attachment portion 42a. Therefore, the attachment bracket 42 is more easily deformed than the front bracket 13. Accordingly, as the bolt 51 is fastened, the front-bracket attachment portion 42a of the attachment bracket 42 makes close contact with the side wall portion 13b of the front bracket 13 while the bottom face of the connection portion 42f of the attachment bracket 42 contacts the top face of the top face portion 12a of the upper rail 12. That is, the attachment bracket 42 is attached to the front bracket 13 so as to absorb a variation in the angle between the bottom wall portion 13a and the side wall portion 13b of the front bracket 13, and an angle of the connection portion 42f with respect to the top face portion 12a of the upper rail 12 becomes uniform. This accordingly suppresses a variation in the angle formed by the connection portion 42f with respect to the top face portion 12a of the upper rail 12, the angle greatly affecting a distance between the detection face portion 43a of the detected body 43 and the magnetic-force detecting portion 41a of the magnetic detector 41. After that, a wiring connector is attached to the connector attachment portion 41b of the magnetic detector 41.

A variation in an angle between the connection portion 42f and the magnetic-detector attachment portion 42c of the attachment bracket 42 does not greatly affect the distance between the detection face portion 43a and the magnetic-force detecting portion 41a, because a corner portion between the connection portion 42f and the magnetic-detector attachment portion 42c is close to the detection face portion 43a and the magnetic-force detecting portion 41a. Further, since the rib 42f3 is provided to extend from the connection portion 42f to the lower end of the magnetic-detector attachment portion 42c in the attachment bracket 42, spring back at the time of press forming is reduced, thereby suppressing the variation in the angle more effectively.

As illustrated in FIG. 5, in the vicinity of the front end of the lower rail 11 to which the detected body 43 is attached, a bottom face (a surface having a strong magnetic field) of the magnetic-force detecting portion 41a of the magnetic detector 41 is disposed close to a top face of the detection face portion 43a of the detected body 43 so as to face the top face of the detection face portion 43a. Thus, the magnetic detector 41 can detect the detected body 43. In this state, the magnetic-force detecting portion 41a is placed at a closest position with respect to the detection face portion 43a. At this time, it is possible to detect that a position in the upper rail 12, to which the magnetic detector 41 is attached, is near the front end of the lower rail 11 to which the detected body 43 is attached. By using a detection signal at this time, when the upper rail 12 is disposed at a forward position relative to the lower rail 11, that is, when a physically small occupant is seated, it is possible to perform, for example, a control to reduce an expansion size of an airbag provided in a vehicle.

A specific embodiment has been described above, but the invention is not limited to the appearance and the configuration described in the above embodiment, and various modifications, additions, and deletions may be made without departing from the scope of the invention. For example, the following modifications are included.

In the above embodiment, the front bracket 13 and the attachment bracket 42 are configured such that the bottom face of the connection portion 42f of the attachment bracket 42 contacts the top face of the top face portion 12a of the upper rail 12. However, the invention is not limited to this configuration. The front bracket 13 may be formed to have a large size such that the bottom face of the connection portion 42f of the attachment bracket 42 contacts the top face of the bottom wall portion 13a of the front bracket 13.

In the above embodiment, the magnetic-detector attachment portion 42c for attaching the magnetic detector 41 to the attachment bracket 42 is formed so as to extend upward perpendicularly to the connection portion 42f. However, the invention is not limited to this configuration. The connection portion 42f may be extended toward a side opposite to the front-bracket attachment portion 42a such that the magnetic detector 41 is attached to an extended part of the connection portion 42f.

In the above embodiment, the magnetic detector 41 is attached to the upper rail 12 and the detected body 43 is attached to the lower rail 11. However, the invention is not limited to this configuration. The magnetic detector 41 and the detected body 43 may be attached in an opposite manner, that is, the magnetic detector 41 may be attached to the lower rail 11, and the detected body 43 may be attached to the upper rail 12. However, in that case, it may be necessary to satisfy one or more conditions. For example, it is necessary to satisfy a condition that the lower rail 11 can be disposed such that there is space between the lower rail 11 and the floor F and the attachment bracket can be disposed across the lower rail 11 in the right-left direction.

In the above embodiment, the constricted part 42f1 is provided in an end portion of the connection portion 42f on the side of the front-bracket attachment portion 42a, as a weakened portion of the attachment bracket 42. However, the invention is not limited to this configuration. A cut portion may be provided in an end portion of the connection portion 42*f* in the front-rear direction, or a thinned portion or a hole extending in the front-rear direction may be provided in the end portion of the connection portion 42*f* in the front-rear direction. Further, a cut portion, a thinned part, or a hole may be provided in the front-bracket attachment portion 42*a* of the attachment bracket 42.

What is claimed is:

1. A slide position detecting device for a vehicle seat, comprising:
    a magnetic detector disposed in one of a lower rail and an upper rail, the lower rail being fixed to a body of a vehicle, the upper rail being fixed to the vehicle seat and fitted to the lower rail so as to be slidable in a front-rear direction;
    a detected portion disposed in the other of the lower rail and the upper rail; and
    an attachment bracket including a bottom plate portion and a side plate portion combined with the bottom plate portion, wherein
    the upper rail includes a top face portion and a pair of side face portions combined with the top face portion, the upper rail having a sectional shape in a right-left direction that is a reverse U-shape opened downward,
    a bottom wall portion of a seat-side member that includes the bottom wall portion and a side wall portion combined with the bottom wall portion is attached to a top face of the top face portion in a state where the side wall portion is disposed on a side of one end of the top face portion in the right-left direction such that the side wall portion extends upward,
    one of the magnetic detector and the detected portion is disposed on a side of another end of the top face portion in the right-left direction and is attached to the side wall portion of the seat-side member via the attachment bracket,
    a first angle between the bottom plate portion and the side plate portion of the attachment bracket is equal to or larger than a second angle between the bottom wall portion and the side wall portion of the seat-side member,
    rigidity that maintains the angle between the bottom plate portion and the side plate portion of the attachment bracket is set to be lower than rigidity that maintains the angle between the bottom wall portion and the side wall portion of the seat-side member, and
    when the side plate portion of the attachment bracket is fastened and fixed to the side wall portion of the seat-side member, the bottom plate portion of the attachment bracket contacts one of the bottom wall portion of the seat-side member and the top face portion of the upper rail, and is fixed in a state where the angle between the bottom plate portion and the side plate portion of the attachment bracket coincides with the angle between the bottom wall portion and the side wall portion of the seat-side member.

2. The slide position detecting device according to claim 1, wherein
    a weakened portion that weakens the rigidity that maintains the angle between the bottom plate portion and the side plate portion of the attachment bracket is provided in one of the bottom plate portion and the side plate portion at a position in a vicinity of a connected part between the bottom plate portion and the side plate portion.

3. The slide position detecting device according to claim 1, wherein
    an end portion of the bottom plate portion of the attachment bracket on a side opposite to the side plate portion is provided with an attachment seat portion extending upward and facing the side plate portion, and
    the one of the magnetic detector and the detected portion is attached to the attachment seat portion.

4. The slide position detecting device according to claim 3, wherein
    a projecting rib continuously extending from the bottom plate portion to the attachment seat portion of the attachment bracket is provided on an inner side of the attachment bracket.

5. The slide position detecting device according to claim 1, wherein
    a part of the side plate portion is fastened to the side wall portion of the seat-side member with a bolt, and the part is disposed between a front end and a rear end of the bottom plate portion of the attachment bracket.

6. The slide position detecting device according to claim 1, wherein
    the seat-side member has an L-shaped section in the right-left direction by combining the bottom wall portion and the side wall portion, and
    the attachment bracket has an L-shaped section in the right-left direction by combining the bottom plate portion and the side plate portion.

7. The slide position detecting device according to claim 1, wherein the attachment bracket is thinner than the seat-side member.

* * * * *